US006336469B1

(12) United States Patent
Nixon et al.

(10) Patent No.: US 6,336,469 B1
(45) Date of Patent: Jan. 8, 2002

(54) DOMESTIC HOT WATER SERVICE INLET SHUT OFF VALVE TRIGGERED BY FLUID LEVEL IN OVERFLOW TRAY

(76) Inventors: Adrian John Nixon, 52 Parkers Road, Parkdale, VIC 3195 (AU); David Thomas Hair, Denmar Street, Albury, NSW 2640 (AU)

( * ) Notice: Subject to any disclaimer, the term of this patent is extended or adjusted under 35 U.S.C. 154(b) by 0 days.

(21) Appl. No.: 09/673,403
(22) PCT Filed: Apr. 22, 1999
(86) PCT No.: PCT/AU99/00301
  § 371 Date: Oct. 17, 2000
  § 102(e) Date: Oct. 17, 2000
(87) PCT Pub. No.: WO99/54668
  PCT Pub. Date: Oct. 28, 1999

(30) Foreign Application Priority Data

Apr. 22, 1998 (AU) .............................. PP3096
Aug. 3, 1998 (AU) .............................. PP4986

(51) Int. Cl.[7] .......................... F16K 31/32; F16K 31/44; F16K 33/00
(52) U.S. Cl. .................. 137/312; 122/504; 122/507; 137/421; 137/447; 137/449; 251/74
(58) Field of Search ................... 137/312, 416, 137/420, 421, 447, 449; 251/73, 74; 122/504.2, 507, 504

(56) References Cited

U.S. PATENT DOCUMENTS

| 201,979 A | * | 4/1878 | Anderson | 137/421 |
| 3,122,351 A | * | 2/1964 | Brown | 251/73 |
| 3,473,553 A | * | 10/1969 | Collins | 137/312 |
| 3,920,031 A | * | 11/1975 | Maxfield | 137/312 |
| 4,269,386 A | * | 5/1981 | Crowe | 251/74 |
| 4,637,425 A | | 1/1987 | Petersen | 137/412 |
| 4,805,662 A | * | 2/1989 | Moody | 137/312 |
| 4,821,759 A | * | 4/1989 | Diamond | 251/74 |
| 5,193,780 A | * | 3/1993 | Franklin | 251/74 |
| 5,240,022 A | | 8/1993 | Franklin | 137/312 |
| 5,345,224 A | | 9/1994 | Brown | 346/605 |
| 5,632,302 A | | 5/1997 | Lenoir | 137/312 |
| 5,682,919 A | | 11/1997 | Dimaggio | 137/312 |
| 5,697,397 A | * | 12/1997 | Mellem et al. | 251/74 |
| 5,771,916 A | * | 6/1998 | Armenia et al. | 137/312 |

FOREIGN PATENT DOCUMENTS

GB      2130686      6/1984

* cited by examiner

Primary Examiner—George L. Walton

(57) ABSTRACT

A mechanism for opening or closing a shut-off valve, the mechanism having a valve actuator for moving the valve from a first position to a second position, an urging means, a trigger which, when activated, triggers operation of the valve actuator, the trigger including a retainer which ordinarily holds the shut-off valve in the first position against the force applied by urging means, and a sensor reactive to an external stimulus which releases the trigger upon receiving appropriate external stimulus.

41 Claims, 8 Drawing Sheets

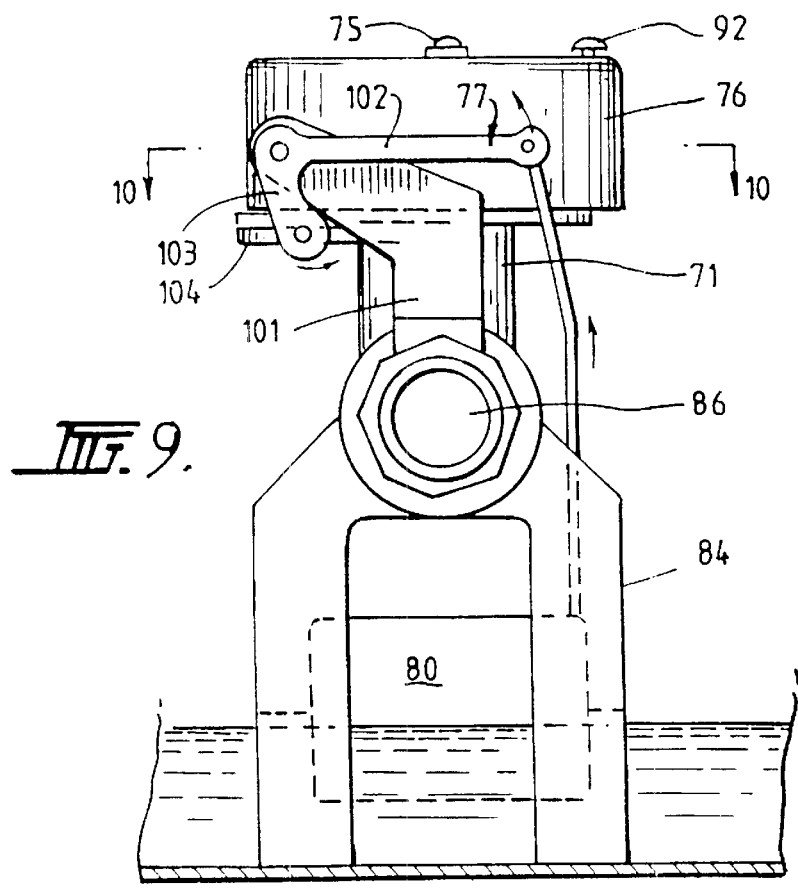
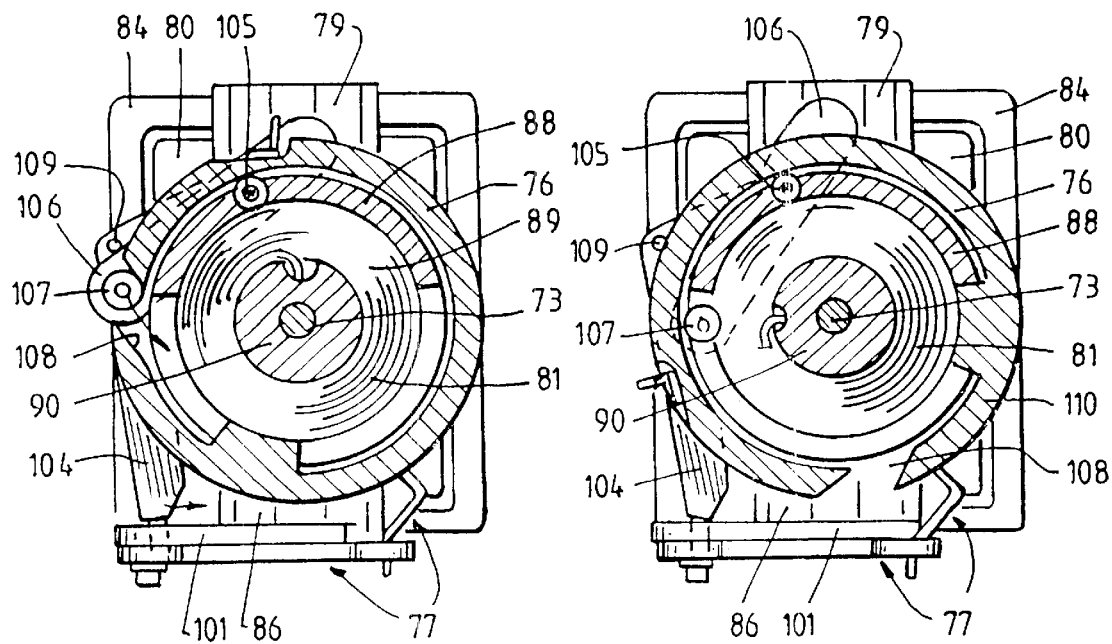
Fig. 9.
Fig. 10.
Fig. 11.

DOMESTIC HOT WATER SERVICE INLET SHUT OFF VALVE TRIGGERED BY FLUID LEVEL IN OVERFLOW TRAY

TECHNICAL FIELD

The present invention is concerned with a mechanism for opening or closing a shut-off valve and, more particularly, with a closing mechanism for a shut-off valve capable of closing the inlet to a hot water system upon detection of leakage from the system.

BACKGROUND ART

Domestic hot water systems generally consist of a tank large enough to contain sufficient hot water for the needs of the user and having a heating element in its base, the tank also including an inlet from a mains water supply adjacent its base and an outlet for hot water. When hot water is drawn off through the outlet it is continuously replaced with cold water from the mains through the inlet so as to maintain the water level in the tank. It will be appreciated that if the tank springs a leak the water leaking from the tank will be continuously replaced, so the leak will continue until the flow of water through the inlet is stopped. Usually this can only be achieved by turning the domestic water supply off at its connection to the mains. This system is adequate where the leak is recognised quickly or where leakage from the hot water system can cause little or no damage.

However, there is an increasing trend towards higher density living and many people live in flats or town houses. In this type of dwelling there is either no yard or a very small yard, so hot water systems are frequently located within the dwelling, typically in a cupboard in the bathroom, laundry or a hallway. Such dwellings may also be multi-storey. Thus, if a leak occurs which is not noticed quickly by the resident, for example because the resident is not present in dwelling, the potential for damage within the resident's dwelling and, in multi-storey complexes, the dwellings below is considerable. Very large volumes of water can leak from a hot water system in a relatively short time where a leak remains undetected and this can cause extensive damage to floor coverings and furnishings and, in multi-storey dwellings, to wiring in the ceiling of dwellings below the one in which the leak occurs. Similarly, in multi-storey office complexes damage to wiring for computers and the like in offices below the water storage tank can occur. Undoubtedly, similar situations can also occur in different contexts. Accordingly, it would be desirable to have a shut-off valve which can be actuated in response to external stimulus such as, for example, leakage of water from a domestic hot water system.

DISCLOSURE OF INVENTION

According to a first aspect of the present invention, there is provided a mechanism for opening or closing a valve through which a liquid can flow when open, the closing mechanism having valve actuation means for moving said valve from a first position to a second position under the urging of the urging means, trigger means which, when released, trigger operation of said valve actuation means, said trigger means including retainer means which ordinarily hold said shut-off valve in said first position against the force applied by said urging means, and sensor means arranged so as to be displaced by a rise in the level of the liquid when it is suitably contained, whereby displacement of said sensor means provides a stimulus which is transmitted through a mechanical interaction to said trigger means so as to release said trigger means.

Preferably the detector for sensing the level of the liquid, for example water, is a float disposed in a vessel, the float having a sufficiently low density to float upon the surface of said liquid when it enters the vessel. In this arrangement the detector for sensing the level of liquid, such as a float, is in operative association with the trigger means, whereby detection of a rise in the level of the liquid, such as by lifting of the float, releases float, releases said trigger means.

The connection between the float and the trigger means may be by a mechanical connection, and typically is a lever or a plurality of pivotally connected levers, but can also be due to a mechanical interaction such as abutment of an element connected to the sensor means and an element connected to the trigger means.

In a preferred embodiment of the invention, the valve is a shut-off valve in the inlet to a domestic hot water system, which is itself positioned inside a vessel adapted to contain a small volume of overflow water. It will be appreciated that in this application said first position has the valve open and said second position has the valve closed. In this embodiment of the invention, a float is positioned within the vessel and the float is connected to the trigger means by a series of levers. Accordingly, when water enters the vessel the float will float upon its surface and rise towards the top of the vessel, ultimately transferring a signal to the trigger means through the levers so as to release said trigger means.

The float may also be mounted in a float chamber adapted to receive any overflow water. Alternatively, the float may be located in a space between the inner wall and outer casing of the hot water system.

Typically said trigger means is an arrangement in which a pivotal motion is induced in a trigger actuating pivoting lever by the sensor means in order to release the trigger means. Preferably, the trigger actuating pivoting lever includes a portion responsive to the sensor means and a hooked projection constituting retainer means which engages a trigger pin. Typically said first portion engages or forms one end of a lever which connects the sensor means to the trigger means. The end of the lever distal to the cam is caused to move when a rise in the level of liquid is detected, thereby inducing a pivotal motion in the trigger actuating pivoting lever. The resultant pivotal motion releases the engagement of said second portion and of the trigger pin.

Preferably, said trigger means also includes displacement means for displacing the trigger pin once released. Advantageously, said displacement means comprises a trigger spring adapted to act on the trigger pin and actively displace it so as to trigger operation of said valve actuation means.

Typically the trigger pin is slidably mounted in a housing for part of its length. The trigger pin has a collar at one end which rests on said housing in the locked configuration but is acted upon by the trigger spring once the second portion of the cam disengages the trigger pin The trigger pin is in operative association with the valve actuation means at its other end, which also protrudes from the housing. This end of the trigger pin also includes means for engaging said second portion of the trigger actuating pivoting lever, typically a pin which, in the locked configuration, rests in a hooked end of said second portion of the trigger actuating pivoting lever.

In an alternative embodiment of the invention, said retainer means comprises a mechanical catch which, when released, triggers operation of said valve actuation means. Typically the mechanical catch is formed on a lever having the float attached to its other end or to the end of a connected lever. In one form of the invention the lever is adapted for pivotal motion hence, in operation, lifting of the float causes the lever to pivot and lifts the catch out of catch receiving means associated with said valve actuation means. In an alternative arrangement the catch is pushed into and out of engagement with said valve actuation means through a physical interaction between one of the group of connected levers to which the float is attached and the catch. In particular, the catch is formed on a lever whose motion is not determined by transmission of motion through the group of levers to which the float is attached, but which may come into abutment with one of said levers when they move in response to the float rising. The motion in the lever on which the catch is formed which is induced by said abutment brings the catch out of engagement with the valve actuation means so as to allow the valve to move from the open position to the closed position.

Typically, said valve actuation means has a valve rotating means such as a rotor connected to a spindle in operative association with the shut-off valve, which is a ball-type valve, said urging means being adapted to induce a rotary motion in the valve rotating means and locking means in operative association with the trigger means for preventing the induction of rotary motion in the valve rotating means until the trigger means is released.

In one embodiment of the invention, said urging means comprises a torsion spring adapted to act on a rotor connected to a spindle. In this case the locking means comprises a locking cap which extends over and around the rotor and holds the torsion spring in compressed configuration.

Interaction with the trigger pin is achieved by way of an extension from the locking cap which includes an orifice in which one end of the trigger pin is received. In this arrangement displacement of the trigger pin allows the extension of the locking cap to move also, whereas it is prevented from moving while the trigger pin cannot move, and so the locking cap is released. The release of the locking cap releases the pressure maintaining the torsion spring in the compressed configuration and a rotary motion is spontaneously induced in the rotor and transmitted to the spindle, with the result that the shut-off valve is actuated.

In an alternative embodiment of the invention, said urging means comprises at least one compression spring adapted to apply a rotational force to a rotor connected to a spindle. Preferably, the arrangement comprises two offset compression springs, each of which acts on a roller-type pin which in turn acts on said rotor. In this arrangement each of the pins has an orifice formed on its top surface in which one end of the trigger pin can be received. When the trigger pin is received in the orifice in one of the pins it is a sufficiently tight fit to prevent rotation of the pin under the urging of the compression spring acting thereon, but once the locking pin is removed the compression springs are able to decompress which induces rotation in the pins and in turn induces a rotary motion in said rotor.

In still another embodiment of the invention, said urging means comprises a compression spring adapted to act on a rotor connected to a spindle, wherein said rotor is constrained so as to be able only to move in a rotary motion. In this case the housing in which the compression spring and rotor are located comprises inner and outer sleeves, and a compression spring is located between the inner and outer sleeves but is held in the compressed configuration when the apparatus is in locked configuration. The rotor has a groove formed therein which receives pins formed on the inner sleeve, and is configured so that only a rotary motion can be induced in the rotor. The outer sleeve includes a nib which engages an arm extending from the trigger pin and this arm holds the outer sleeve close to the inner sleeve against the urging of the compression spring positioned therebetween. When the trigger pin is released, the compression spring urges the outer sleeve away from the inner sleeve and so induces a rotary motion in the rotor which is transmitted through the rotor to the spindle.

In the embodiment of the invention wherein the retainer means comprises a mechanical catch, the valve actuation means comprises a locking cap adapted for pivotal motion when mounted to the shut-off valve and defining a cavity therebetween when so mounted, and said cavity includes a spring adapted to return the locking cap to its origin. In this embodiment of the invention the locking cap is associated with the spindle attached to the ball of the shut-off valve, whereby rotation of the locking cap brings the valve from a closed to an open position where it is retained through engagement of the latch with the latch receiving means in the locking cap.

Typically, the shut-off valve is a ball valve or a butterfly valve.

According to a second aspect of the present invention there is provided a valve through which a liquid can flow when open including a valve housing provided with at least two passage ports, a passage port closure member rotatable from a first to a second position and valve actuation means for rotating said passage port closure member from said first position to said second position under the urging of urging means, trigger means which, when released, trigger operation of said valve actuation means, said trigger means including retainer means which ordinarily hold said shut-off valve in said first position against the force applied by said urging means, and sensor means arranged so as to be displaced by a rise in the level of the liquid when it is suitably contained, whereby displacement of said sensor means provides a stimulus which is transmitted through a mechanical interaction to said trigger means so as to release said trigger means.

Typically the closure member is a ball of the type used in ball valves or a flap of the type used in butterfly valves.

According to a third aspect of the present invention there is provided a hot water system suitable for domestic use including a hot water tank associated with a vessel for collecting overflow water, a mains inlet to said hot water tank from a mains supply and an outlet for hot water, said inlet including a shut-off valve having a valve housing provided with at least two passage ports, a first passage port serving as an inlet to said shut-off valve from said mains inlet and a second passage port serving as an outlet from said shut-off valve to said mains inlet, a passage port closure member rotatable from an open position in which flow through said mains inlet is unimpeded to a closed position in which flow through said mains inlet is prevented, valve actuation means for rotating said passage port closure member from an open to a closed position under the urging of urging means, trigger means which, when released, trigger operation of said valve actuation means, said trigger means including retainer means which ordinarily hold said shut-off valve in said open position against the force applied by said urging means, and sensor means arranged so as to be displaced by a rise in the level of water when it is suitably contained, whereby displacement of said sensor means provides a stimulus which is transmitted through a mechanical interaction to said trigger means so as to release said trigger means.

Typically the hot water tank is positioned within the vessel. Alternatively, a small overflow tank or chamber may be in fluid flow connection with the vessel, and the float is positioned within this, hence it is referred to as a float chamber. The float chamber may be formed as an extension of the outer wall of the hot water tank.

BRIEF DESCRIPTION OF DRAWINGS

Preferred embodiments of the invention will now be described by way of illustration only with reference to the accompanying drawings, in which:

FIG. 9 is an end view of the shut-off valve shown in FIG. 8, taken in the direction of arrow 9 on FIG. 8;

FIG. 10 is a schematic cross-sectional view taken on the line 10—10 on FIG. 9, with the valve in the open position;

FIG. 11 is a view similar to FIG. 10, but with the valve in the closed position;

MODES FOR CARRYING OUT THE INVENTION

Figure 1:
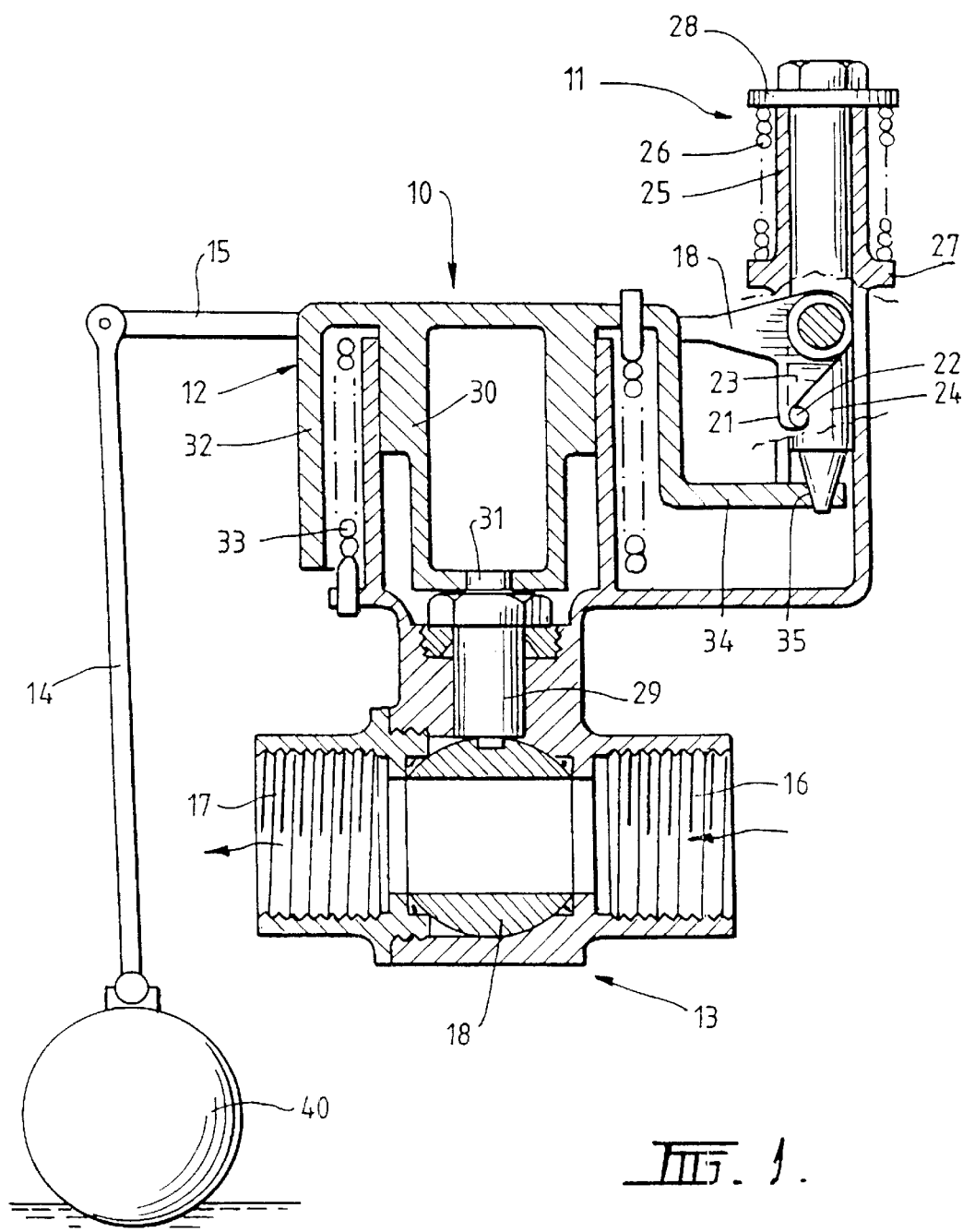
FIG. 1 is a front elevation, partly sectioned, of a shut-off valve in accordance with a first embodiment of the present invention, shown in the open position.

The Figures will now be described primarily with reference to FIG. 1, but with reference to the other Figures where they differ from FIG. 1.

The Figures show a shut-off valve 10 including trigger means 11, valve actuation means 12 and ball valve 13 which, other than in its interaction with the valve actuation means and trigger means is conventional. The sensor means is not shown in its entirety in all Figures but comprises a float 40 (as shown in FIGS. 1 and 2) which would ordinarily be connected to lever 14 in the devices shown in the other Figures. The float is a conventional float, consisting of a hollow sphere of a plastics material which is buoyant when placed in water. The float is connected to the lever 14 by conventional means.

The shut-off valve 10 is typically connected in a mains inlet to the hot water tank of a hot water system, which typically rests within a vessel adapted collect overflow water. The shut-off valve 10 may be configured with the float to either side of the valve, either between the valve and the hot water system or between the valve and the wall of the vessel, or externally to the vessel provided that the lever arrangement extends over the wall of the vessel so that the float is located within the vessel. Accordingly, although in this case the passage port to the right of the drawing is the inlet 16 to the ball valve 13 and the passage port to the left of the drawing is the outlet 17 from the ball valve 13 these items could equally well be reversed. It will be appreciated that the passage port closure member, in this case ball 18, is illustrated in the open position in FIG. 1, whereby the flow of water through the inlet pipe to the hot water system from the mains is unimpeded. However, rotation of the ball 18 through 90° will close the passage and prevent the flow of water through the inlet to the hot water system, and this is shown in FIG. 2. In this respect, the ball valve 13 is entirely conventional in its operation.

The shut-off valve 10 includes trigger means 11 in operative connection with the lever 15 forming a part of the sensor means. In the embodiment shown, the lever 15 has a first portion of a trigger actuating pivoting lever formed at one end, and is pivotally connected to lever 14 at its other end. The trigger actuating pivoting lever, generally indicated as 19, includes a second portion which is generally hooked shaped and engages a pin 22 formed on trigger pin 24. The trigger actuating pivoting lever also includes an abutment surface 23 which maintains contact with the pin when the trigger is released.

The trigger means also includes displacement means for displacing the trigger pin 24 upon release of the pin 22 by the trigger actuating pivoting lever 19, comprising a housing 25 in which the trigger pin is slidably mounted and a spring 26 for displacing the trigger pin with the housing 25. It will be noted that the housing 25 includes a nib 27 and the trigger pin 24 includes a collar 28 between which the spring 26 is compressed and the trigger means 11 is in the locked configuration. It will be noted that the housing 25 does not encase the bottom portion of the trigger pin 24 when the trigger means 11 is in the locked configuration.

Figure 2:
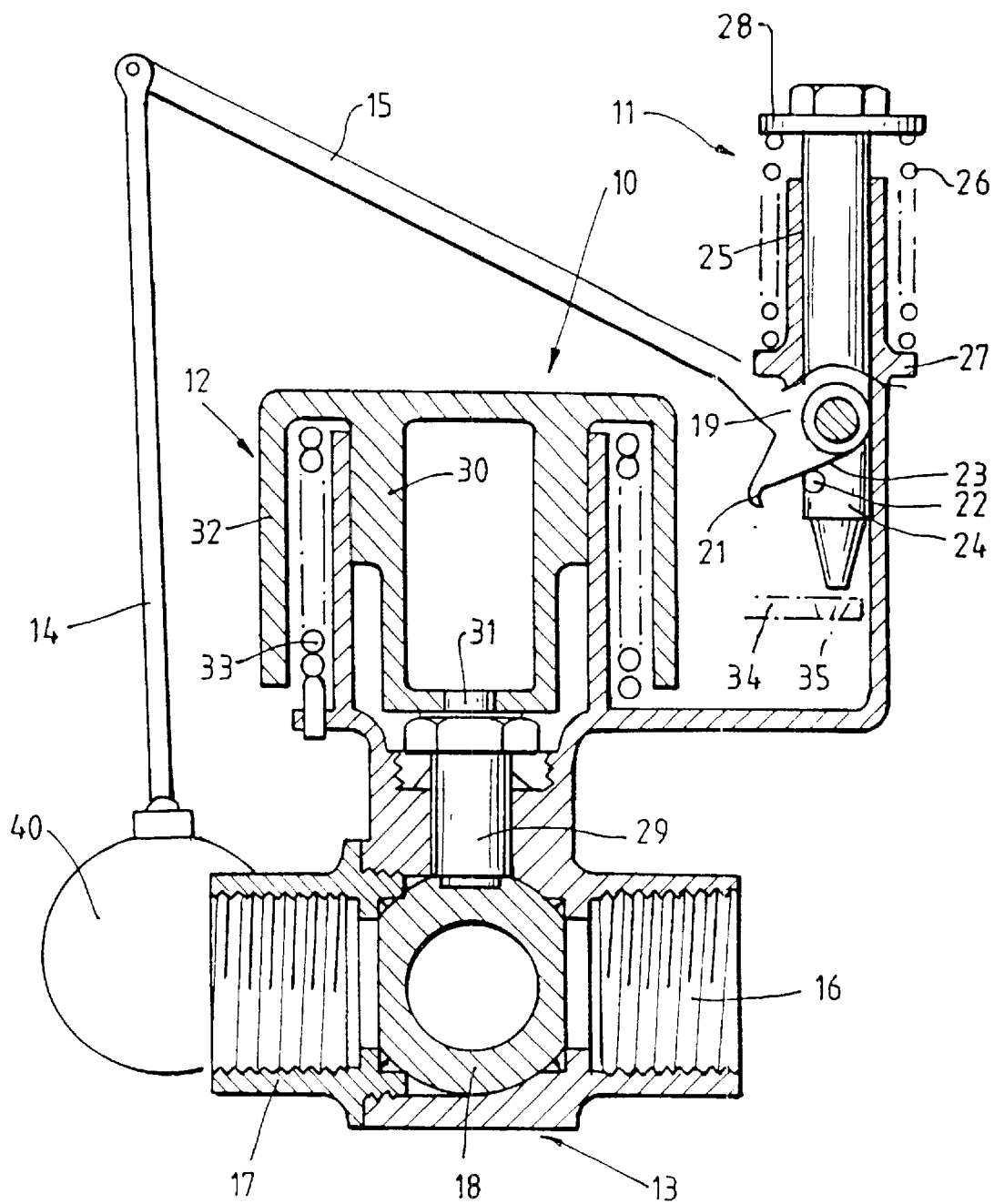
FIG. 2 is a similar view to FIG. 1, but with the valve shown in the closed position.

In the embodiment of the invention shown in FIG. 1 the valve actuation means 12 includes a valve rotating means, in this case a spindle 29, which is connected to the ball 18 of the ball valve 13, urging means adapted to induce a rotary motion in the spindle, in this case rotor 30 which is connected to spindle 29 by retaining bolt 31 and has a torsion spring 33 configured around rotor 30. The valve actuation means 12 further comprises locking means, in this case locking cap 32, which holds the torsion spring 33 in compressed configuration. The locking cap 32 has an extension 34 with an orifice 35 formed therein which receives an end of the locking pin 24.

Figure 3:
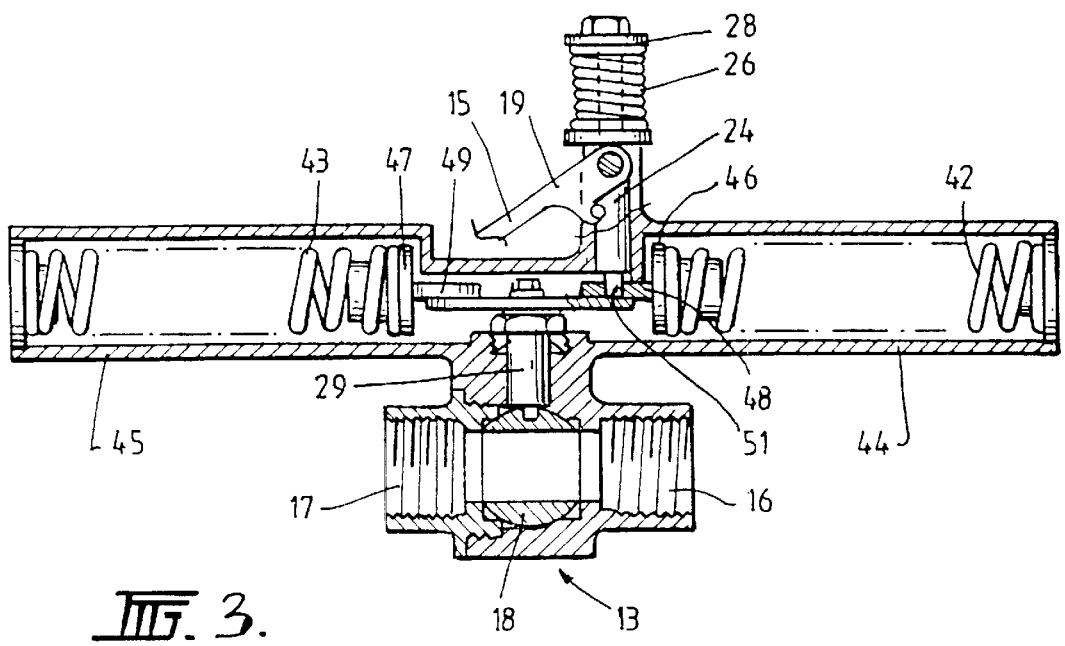
FIG. 3 is a front elevation, partly sectioned, of a shut-off valve in accordance with a second embodiment of the present invention.
Figure 4:
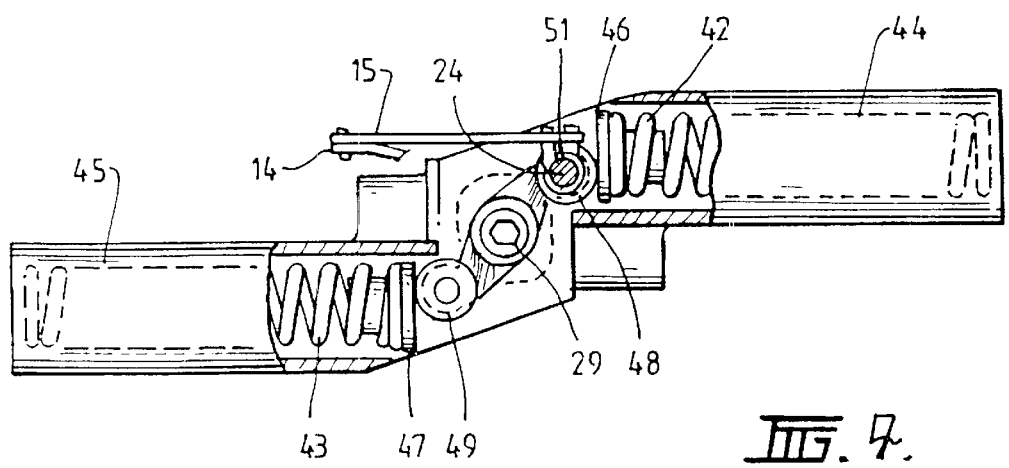
FIG. 4 is a plan view of the shut-off valve shown in FIG. 3.

In the embodiment of the invention shown in FIGS. 3 and 4 the valve actuation means 12 also includes a valve rotating means as in FIG. 1 but in this case the drive means for inducing a rotary motion in the spindle is different. In this case a pair of compression springs 42, 43 are contained in housings 44, 45, offset to the rotor 30 which is connected to spindle 29. Each of the springs 42, 43 includes a stem 46, 47 which abuts a roller-type pin 48, 49. Pin 48 includes an orifice 51 in its top surface which receives one end of trigger pin 24, and when trigger pin 24 is located within orifice 51 the pin 48 is unable to rotate. Accordingly, the pin 48 is unable to rotate under the urging of spring 42 in this condition but can rotate under the urging of spring 42 when locking pin 24 is removed from the orifice 31, thereby allowing pin 49 to rotate under the urging of spring 43 and inducing a rotary motion in rotor 30.

Figure 5:
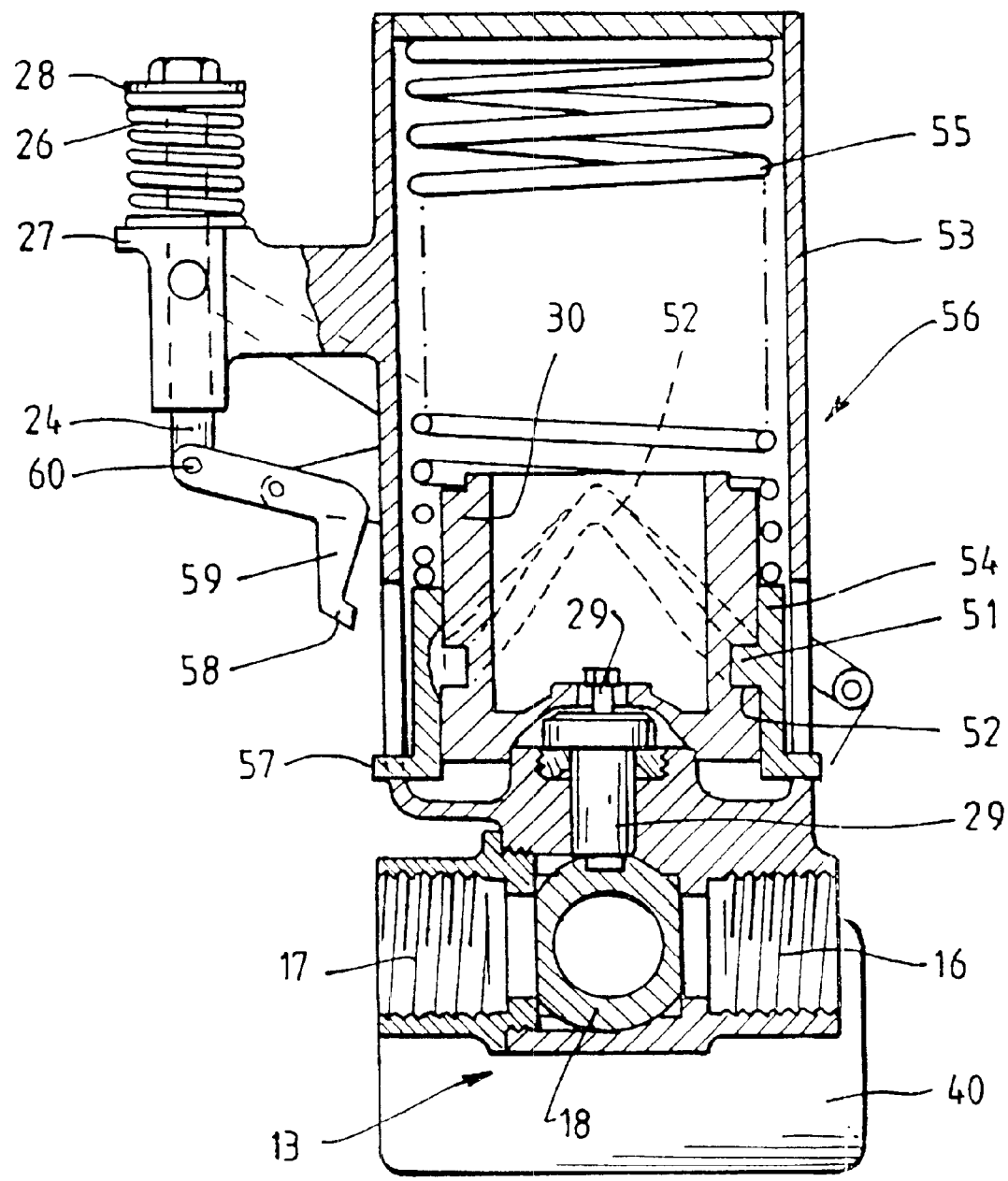
FIG. 5 is a front elevation, partly sectioned, of a shut-off valve in accordance with a third embodiment of the present invention.

In the embodiment of the invention shown in FIG. 5, the valve actuating means is once again similar to that described with reference to FIG. 1. However, in this embodiment the rotor 30 has formed on its exterior a groove 52 in which two pins 51 formed on the internal sides of the inner sleeve 54 of the housing 56 containing the arrangement are located. The outer sleeve 53 of the housing 56 is slidable over the inner sleeve 54 under the urging of compression spring 55. The outer sleeve 53 includes a nib 57 which engages a hook 58 on the end of an arm 59 extending from locking pin 24. When the hook 58 disengages nib 57 the outer sleeve is free to slide under the urging of compression spring 55, and in so doing releases the force on inner sleeve 54 which, because the movement of the rotor 30 is guided by the engagement of pins 51 in groove 52, induces a rotary motion therein.

A shut-off valve in accordance with the present invention may be mounted on the inlet pipe to a hot water system either within the surrounds of a vessel within which the hot water system itself is positioned or within a float chamber adapted to receive overflow water. In operation, the ball valve 13 ordinarily remains in the open configuration, as shown, allowing water to flow through the inlet to the hot water system upon demand induced by water leaving the hot water system through the outlet from its tank. However, upon a leak occurring in the tank of the hot water system, water will collect in the vessel surrounding it. Accordingly, a float located in the vessel will rise and lever 14 will move in a substantially vertical direction as a result. The pivotal connection of lever 14 to lever 15 will cause the end of lever 15 distal to the trigger actuating pivoting lever 19 to tend to move in the same direction, which will induce a pivotal motion at its other end. As a result, the trigger actuating pivoting lever 19 will pivot in a clockwise direction and, once the float has raised lever 14 enough to induce a sufficient pivotal motion in trigger actuating pivoting lever 19, the second portion 21 of the trigger actuating pivoting lever 19 will pivot out of engagement with pin 22.

It will be appreciated that pin 22 abuts the abutment surface 23 of the second portion 21 and the pivotal motion will move this surface upwardly in a clockwise direction. As the pin 22 and abutment surface tend to move out of abutment, spring 26 tends to decompress and urges the collar 28 of the trigger pin 24, and hence the trigger pin 24, to move in an upward direction. This means that the pin 22 and abutment surface remain in contact but the pin 22 will be perceived as sliding along and up the abutment surface 23 due to the upward motion of the trigger pin 24 under the urging of spring 26.

With reference to FIG. 1 this upward motion of the trigger pin 24 will also tend to raise the end of the trigger pin 24 out of orifice 35 in the extension 34 of the locking cap 32. The tendency to upward motion of the locking cap 32 releases the compression force acting on torsion spring 33 and, in conventional fashion, the torsion spring 33 induces a rotary motion in rotor 30. The rotary motion of rotor 30 is transmitted through retaining bolt 31 to spindle 29 and so rotation is induced in spindle 29. Spindle 29 is connected to ball 18 of the ball valve 13 and induces rotation of the ball. Rotation of the ball proceeds in conventional fashion through 90º until the ball 18 closes inlet 16 and prevents the passage of water through the inlet from a mains supply to the hot water system.

Likewise, with reference to the embodiment shown in FIGS. 3 and 4, the upward motion of the trigger pin 24 lifts its end from the orifice 51 and allows spring 42 to act upon pulley 48, and also spring 43 to act upon pulley 49, whereby the pulley 50 induces a rotary motion in spindle 30. With reference to the embodiment shown in FIG. 4, lifting of the trigger pin 24 allows arm 59 to pivot through the pivotal link 60 so that the hook 58 on the end of arm 59 pivots out of engagement with nib 57, allowing outer sleeve 53 to move under the urging of spring 55 away from inner sleeve 54. This releases the force upon helical spring 52 and allows it to induce a rotary motion in rotor 30. In each of these embodiments the rotary motion of rotor 30 is transmitted to the ball valve in the manner described above.

Thus, in response to an initial leakage filling the vessel surrounding a hot water system, the flow of water into the tank of the hot water system is closed off by the shut-off valve 10. The operation of the valve in this way prevents overflow of water from the vessel surrounding the hot water system and so prevents damage to the dwelling in which the hot water system is located and/or other dwellings in the same building through continuous overflow of water.

Figure 6:
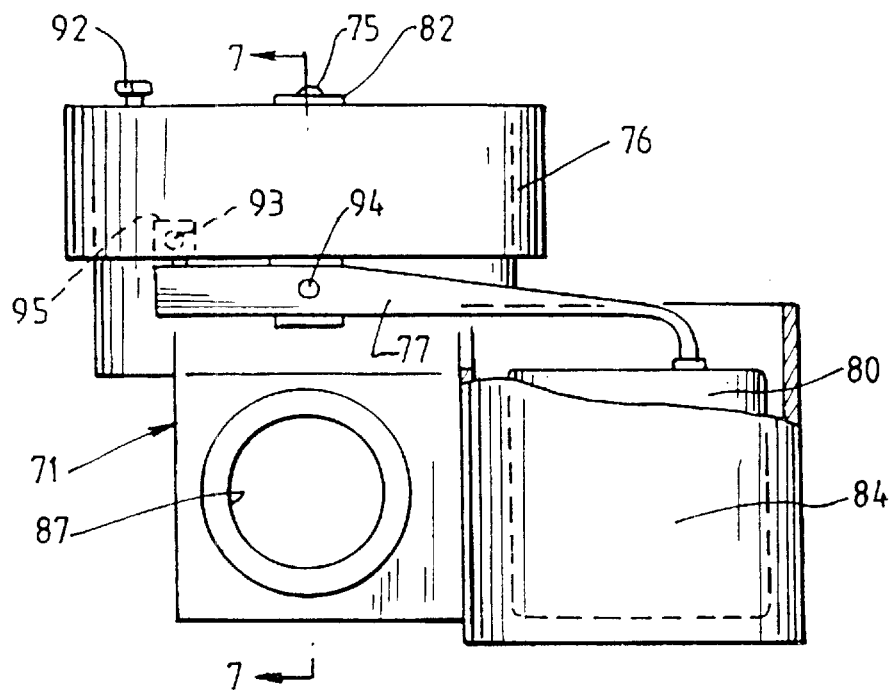
FIG. 6 is a side elevation of a shut-off valve in accordance with a fourth embodiment of the present invention.
Figure 7:
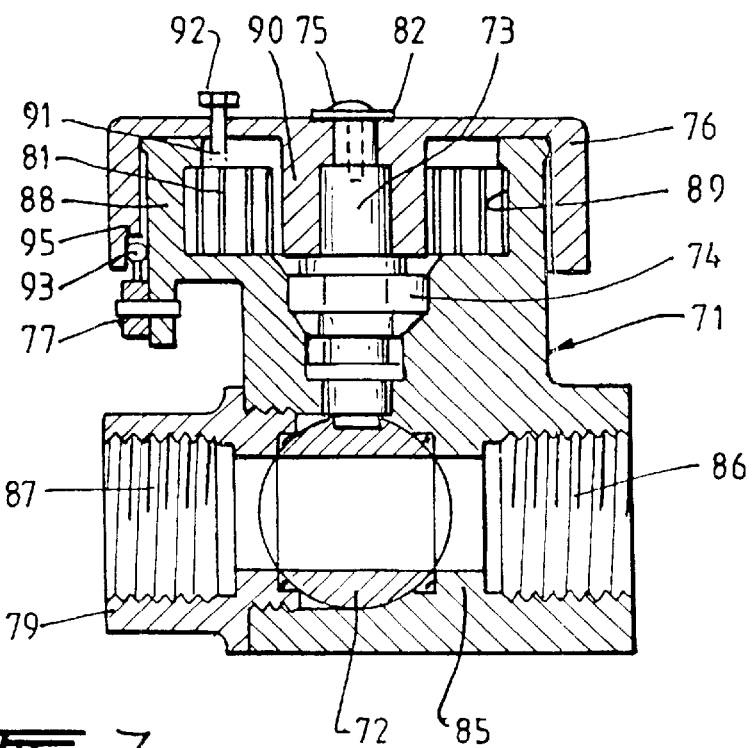
FIG. 7 is a cross-section taken along the line 7—7 in FIG. 6.

In the embodiment of the invention shown in FIGS. 6 and 7 the valve body 71, which is typically constructed of DR brass material, contains a float chamber 84, ball valve housing 85, inlet and outlet ports 86, 87 and a coil spring housing enclosing space 89 in which coil spring 81 is housed. The inlet and outlet ports 86, 87 are adapted for the flow of liquid or gaseous substances from one side of the valve to the other and the seal carrier 79 attaches to the valve body 71. Each of the ports 86, 87 have threaded connections for the connection of standard plumbing fittings. A ball valve 72 is inserted within the valve body 71 between the inlet and outlet and serves to control the flow of substances through the valve in the conventional manner. A spindle actuator shaft 73 extends through the valve body 71 from the rebated top of the ball valve 72 into the locking cap 76. A seal is installed on the shaft to prevent leakage and a gland nut 74 is used to retain this seal in the valve body 71.

The coil spring 81 is held in place in the space 89 within the valve body 71 by creating a slot in the housing 88 to hold one end of the spring material. The locking cap 76 fits over the main body and its central portion 90 extends down into space 89. The central portion 90 is mated to the actuator shaft 73 and is retained in this configuration by securing retainer screw 75 and washer 82 into a tap to thread on the internal dimension of the actuator shaft 73. The locking cap also has a slot formed in the central portion to hold the other end of the spring 81. It will be appreciated that this configuration allows for actuation of the ball valve by rotation of the locking cap 76.

Movement of the locking cap 76 is restricted to allow movement through 90 degrees only so as to provide an open position for the ball valve 72 and a shut position for the ball valve 72 at each extremity of the movement. In order to achieve this a rebate 91 is provided in housing 88 and a screw 92 is placed in the top of the locking cap 76 so as to protrude into the rebate 91. Thus, rotation of the valve through 90 degrees against the urging of the spring 81 can move the valve from a shut position to an open position and, if the locking cap 76 is released the spring 81 returns the ball valve to the closed position. In order to maintain the valve in the open position retainer means are provided. In this case the retainer means comprises a mechanical catch, more particularly, a latch pip 93 mounted to one end of float lever 77, which is attached at its other end to float 80. The float lever 77 is mounted to one edge of the float chamber 84 through pivot hole 94 and is adapted for pivotal motion when the float 80, which is positioned in the float chamber 84, rises when the water level in the float chamber 84 rises. In the absence of water in the float chamber 84 latch pivot 93 engages latching pin rebate 94 formed in the locking cap 76 and prevents rotation of the locking cap. The rebate 94 is positioned so that engagement with the locking pip 93 occurs when the locking cap has been rotated to the open position, and engagement of the locking pip 93 in rebate 94 prevents the return of the locking cap to the shut position. However, if water enters the float chambers 84, the float 80 rises and float lever 74 pivots about the pivot hole 94. The pivotal motion moves locking pip 93 out of engagement with rebate 94 and then locking cap 76 immediately returns to the shut position under the urging of spring 81. Accordingly, in response to an initial leakage filling the float chamber 84 with a flow of water into the tank and the hot water system is closed off.

Figure 8:
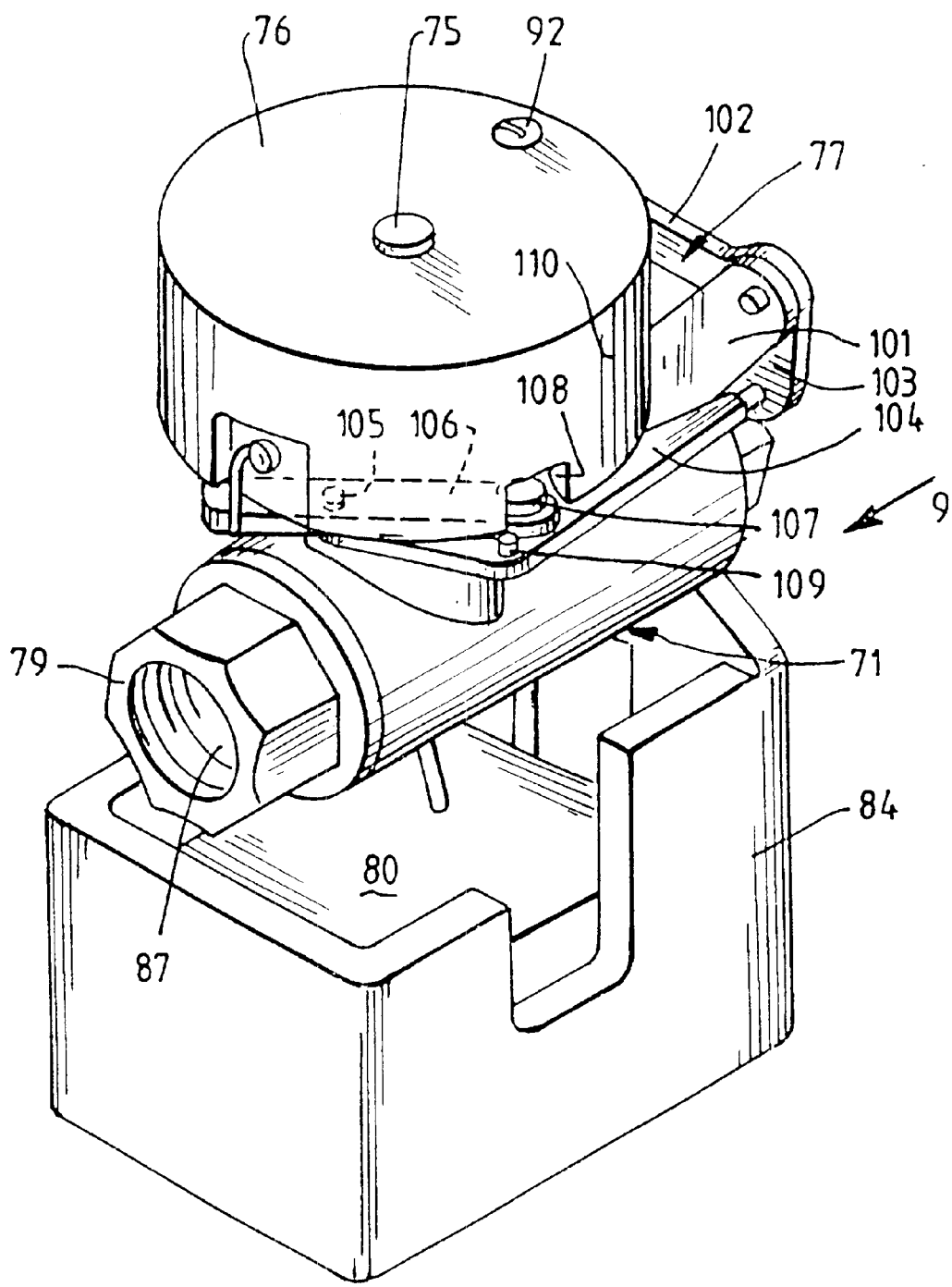
FIG. 8 is a perspective view of a shut-off valve in accordance with a fifth embodiment of the invention.

The embodiment of the invention shown in FIG. 8 is similar in most respects to the embodiment shown in FIGS. 6 and 7, except that the means by which the locking cap 76 if released is different. In this embodiment of the invention the pivot lever 77 is pivoted to body 71 via arm 101, which has a long arm 102 and a short arm 103. Short arm 103 is connected to a further arm 104, which is pivoted at pivot point 105 to the valve body 71. Another arm 106 is also pivoted at pivot point 105. This arm 106 has at one end a roller bearing 107 which, when the valve is in the open position, fits into a slot 108 formed in locking cap 76, and thereby holds the locking cap and prevents the spring within the locking cap from moving to close the valve.

When float 80 rises, it moves arm 77 in an anticlockwise direction (as seen in FIG. 9) which moves short arm 103 to the right, which in turn moves arm 104 in an anticlockwise direction (as seen in FIGS. 10 and 11) via pivot point 105. As arm 104 moves, pin 109, which is formed on lever 104, moves against arm 106 and forces it to move in the same direction, with the result that roller 107 is forced out of slot 108. This releases tension on the spring 81 within the locking cap 76 and so frees the side 110 of locking cap shown in FIG. 8 to move to the position shown in FIG. 11, thereby closing the valve.

Figure 12:
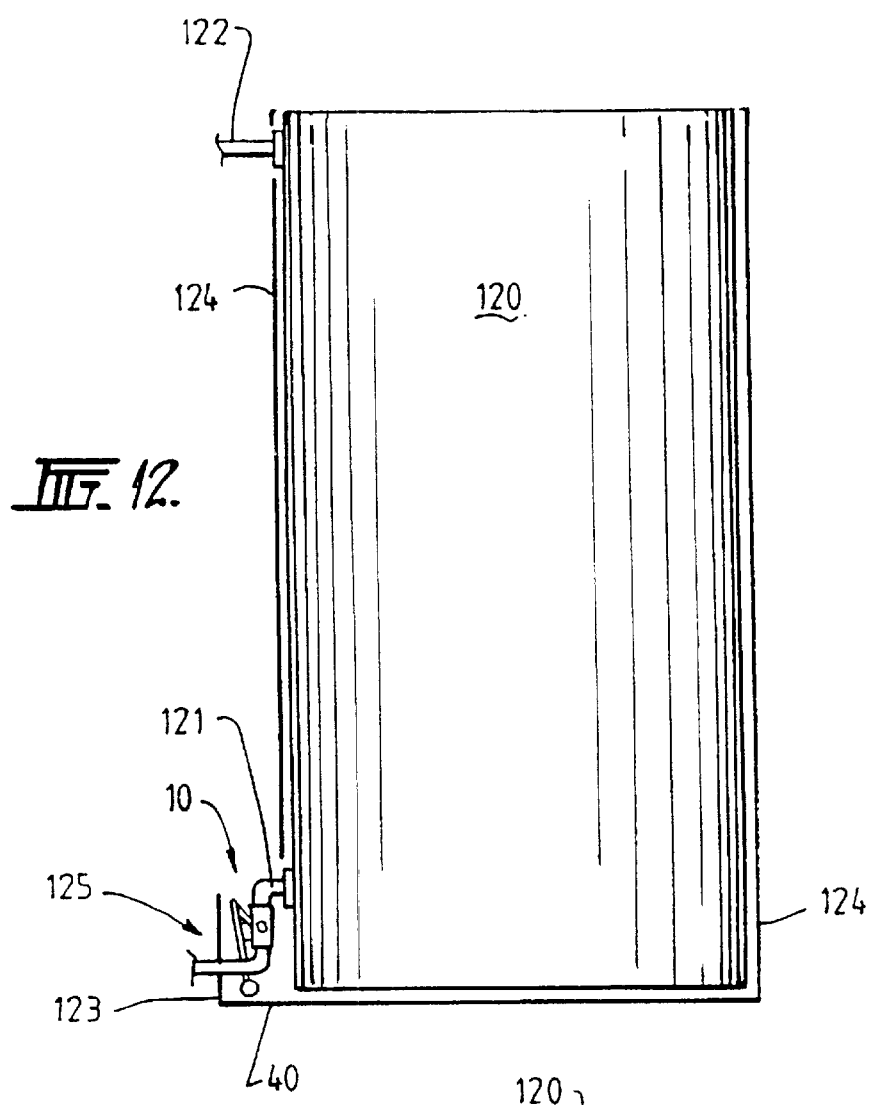
FIG. 12 is a cross-section through a hot water system using a shut-off valve of the type shown in any one of FIGS. 1 to 8.
Figure 13:
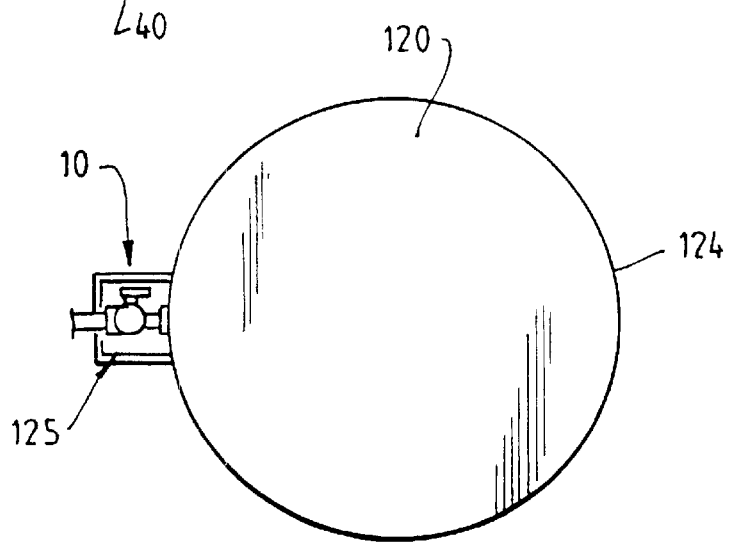
FIG. 13 is a plan view of the hot water system shown in FIG. 9.

FIGS. 12 and 13 show a valve in accordance with any one of the embodiments of the invention described above installed on the mains inlet to a domestic hot water system. The hot water system includes a hot water tank 120 having a mains inlet 121, with the valve 10 inserted at an appropriate position along the inlet, and a hot water outlet 122. In this embodiment of the invention the hot water tank 120 has a float chamber 123 formed as an extension of its outer wall 124. It will be appreciated that any water leaking from the tank will be collected within the outer wall of the hot water system and will quickly flow to the base, whereupon it will cause the float 40 to rise. In this embodiment of the invention a detachable valve cover 125 is provided to protect the shut of valve 10.

Throughout this specification and the claims, the words "comprise", "comprises" and "comprising" are used in a non-exclusive sense.

Variations and modifications of this device will be apparent to the person skilled in the art and those variations and modifications are within the scope of the present invention.
Industrial Applicability The mechanism of the present invention is useful in opening or closing a shut-off valve, for example, to close the inlet to a hot water system upon detection of leakage from the system.

What is claimed is:

1. A mechanism for opening or closing a valve through which a liquid can flow when open, the mechanism having valve actuation means for moving said valve from a first position to a second position under the urging of urging means, trigger means which, when activated, trigger operation of said valve actuation means, said trigger means including retainer means which ordinarily hold said valve in said first position against the force applied by said urging means, and sensor means arranged so as to be displaced by a rise in the level of the liquid when it is suitably contained, whereby displacement of said sensor means provides a stimulus which is transmitted through a mechanical interaction to said trigger means so as to release said trigger means, and wherein said valve actuation means comprises a rotor connected to a spindle adapted for operative association with said valve and said urging means comprises a torsion spring adapted to act on said rotor, and further comprising a locking cap which extends over and around said rotor and holds the torsion spring in a compressed configuration in order to prevent the induction of rotary motion in said spindle until said trigger means is released.

2. A mechanism as claimed in claim 1 in which said sensor means is a float disposed in a vessel in which the liquid is contained.

3. A mechanism as claimed in claim 1 in which stimulus from said sensor means is transmitted through abutment of an element connected to said sensor means and an element connected to said trigger means.

4. A mechanism as claimed in claim 3 in which said retainer means is a mechanical catch.

5. A mechanism as claimed in claim 4 in which the mechanical catch is formed on a lever.

6. A mechanism as claimed in claim 5 in which the lever on which the catch is formed moves so as to bring the catch into and out of engagement with said valve actuation means through coming into abutment with one of a group of levers in operative association with said sensor means.

7. A mechanism as claimed in claim 1 in which stimulus from said sensor means is transmitted through a mechanical connection to said trigger means.

8. A mechanism as claimed in claim 7 in which said sensor means is connected to said trigger means by a lever or a plurality of pivotally connected levers.

9. A mechanism as claimed in claim 8 in which said retainer means is a mechanical catch.

10. A mechanism as claimed in claim 9 in which the mechanical catch is formed on one said lever.

11. A mechanism as claimed in claim 10 in which the mechanical catch is formed on or adjacent to one end of the lever and the lever is adapted for pivotal motion so as to lift the catch into and out of engagement with catch receiving means associated with said valve actuation means.

12. A mechanism as claimed in claim 1 in which the locking cap has formed therein an orifice through which it engages said trigger means.

13. A mechanism as claimed in claim 12 in which the orifice is formed in a lateral extension of the locking cap.

14. A valve through which liquid can flow when open including a valve housing provided with at least two passage ports, a passage port closure member rotatable from a first to a second position and valve actuation means for rotating said passage port closure member from said first to said second position under the urging of urging means, trigger means which, when released, trigger operation of said valve actuation means, said trigger means including retainer means which ordinarily hold said valve in said first position against the force applied by said urging means, and sensor means arranged so as to be displaced by a rise in the level of the liquid when it is suitably contained, whereby displacement of said sensor means provides a stimulus which is transmitted through a mechanical interaction to said trigger means so as to release said trigger means, and wherein said valve actuation means comprises a rotor connected to a spindle in operative association with the passage port closure member and said urging means comprises a torsion spring adapted to act on said rotor, and further comprising a locking cap which extends over and around said rotor and holds the torsion spring in a compressed configuration in order to prevent the induction of rotary motion in said spindle until said trigger means is released.

15. A valve as claimed in claim 14 in which the closure member is a ball of the type used in ball valves.

16. A hot water system suitable for domestic use associated with a vessel for collecting overflow water comprising a hot water tank, a mains inlet to said hot water tank from a mains supply and an outlet for hot water, said inlet including a shut-off valve having a valve housing provided with at least two passage ports, a first passage port serving as an inlet to said shut-off valve from said mains inlet and a second passage port serving as an outlet from said shut-off valve to said mains inlet, a passage port closure member rotatable from an open position in which flow through said mains inlet is unimpeded to a closed position in which flow through said mains inlet is prevented, valve actuation means for rotating said passage port closure member from an open to a closed position under the urging of urging means, trigger means which, when released, trigger operation of said valve actuation means, said trigger means including retainer means which ordinarily hold said shut-off valve in said open position against the force applied by said urging means, and sensor means arranged so as to be displaced by a rise in the level of water when it is suitably contained, whereby displacement of said sensor means provides a stimulus which is transmitted through a mechanical interaction to said trigger means so as to release said trigger means, and wherein said valve actuation means comprises a rotor connected to a spindle in operative association with the passage port closure member and said urging means comprises a torsion spring adapted to act on said rotor, and further comprising a locking cap which extends over and around said rotor and holds said torsion spring in a compressed configuration in order to prevent the induction of rotary motion in said spindle until said trigger means is released.

17. A hot water system as claimed in claim 16 wherein the sensor means is a float.

18. A hot water system as claimed in claim 17 in which said hot water tank is positioned within a vessel for collecting overflow water.

19. A hot water system as claimed in claim 18 in which said vessel has an overflow chamber in fluid flow association therewith, and said sensor means is positioned within said overflow chamber.

20. A hot water system as claimed in claim 16 in which the hot water tank is positioned within the vessel for collecting overflow water.

21. A hot water system as claimed in claim 16 in which the vessel has an overflow chamber in fluid flow association therewith, and the sensor means is positioned within the overflow chamber.

22. A mechanism for opening or closing a valve through which a liquid can flow when open, the mechanism having valve actuation means for moving said valve from a first position to a second position under the urging of urging means, trigger means which, when activated, trigger operation of said valve actuation means, said trigger means including retainer means which ordinarily hold said valve in said first position against the force applied by said urging means, and sensor means arranged so as to be displaced by a rise in the level of the liquid when it is suitably contained, whereby displacement of said sensor means provides a stimulus which is transmitted through a mechanical interaction to said trigger means so as to release said trigger means, and wherein said valve actuation means comprises a rotor connected to a spindle adapted for operative association with said valve and said urging means comprises two off-set compression springs, each of which acts on a roller-type pin which in turn acts on said rotor.

23. A mechanism as claimed in claim 22 in which said sensor means is a float disposed in a vessel in which the liquid is contained.

24. A mechanism as claimed in claim 22 in which stimulus from said sensor means is transmitted through abutment of an element connected to said sensor means and an element connected to said trigger means.

25. A mechanism as claimed in claim 24 in which said retainer means is a mechanical catch.

26. A mechanism as claimed in claim 25 in which said mechanical catch is formed on a lever.

27. A mechanism as claimed in claim 26 in which said lever on which said catch is formed moves so as to bring said catch into and out of engagement with said valve actuation means through coming into abutment with one of a group of levers in operative association with said sensor means.

28. A mechanism as claimed in claim 22 in which stimulus from said sensor means is transmitted through a mechanical connection to said trigger means.

29. A mechanism as claimed in claim 28 in which said sensor means is connected to said trigger means by at least one lever.

30. A mechanism as claimed in claim 29 in which said trigger means includes a trigger actuating pivoting lever.

31. A mechanism as claimed in claim 30 in which said trigger means includes a displacement means, movement of which under the influence of said trigger actuating pivoting lever activates said valve actuation means.

32. A mechanism as claimed in claim 31 in which said displacement means is a trigger pin adapted for withdrawal from engagement with said valve actuation means so as to activate said valve actuation means.

33. A mechanism as claimed in claim 32 in which the trigger actuating pivoting lever includes a portion responsive to the sensor means through induction of rotation in the trigger actuating pivoting lever and a hooked projection constituting said retainer means which ordinarily engages the trigger pin but releases the trigger pin when the trigger actuating pivoting lever rotates.

34. A mechanism as claimed in claim 29 in which said retainer means is a mechanical catch.

35. A mechanism as claimed in claim 34 in which said mechanical catch is formed on one of said at least one lever.

36. A mechanism as claimed in claim 35 in which said mechanical catch is on or adjacent to an end of said lever and said lever is adapted for pivotal motion so as to lift the catch into and out of engagement with catch receiving means associated with said valve actuation means.

37. A mechanism as claimed in claim 22 in which at least one of said roller-type pins has an orifice on a top surface through which said roller-type pin engages said trigger means.

38. A valve through which liquid can flow when open including a valve housing provided with at least two passage ports, a passage port closure member rotatable from a first to a second position and valve actuation means for rotating said passage port closure member from said first to said second position under the urging of urging means, trigger means which, when released, trigger operation of said valve actuation means, said trigger means including retainer means which ordinarily hold said valve in said first position against the force applied by said urging means, and sensor means arranged so as to be displaced by a rise in the level of the liquid when it is suitably contained, whereby displacement of said sensor means provides a stimulus which is transmitted through a mechanical interaction to said trigger means so as to release said trigger means, and wherein said valve actuation means comprises a rotor connected to a spindle in operative association with the passage port closure member and said urging means comprises two off-set compression springs, each of which acts on a roller-type pin which in turn acts on said rotor.

39. A valve as claimed in claim 38 in which said passage port closure member is a ball of the type used in ball valves.

40. A hot water system suitable for domestic use associated with a vessel for collecting overflow water, a mains inlet to said hot water tank from a mains supply and an outlet for hot water, said inlet including a shut-off valve having a valve housing provided with at least two passage ports, a first passage port serving as an inlet to said shut-off valve from said mains inlet and a second passage port serving as an outlet from said shut-off valve to said mains inlet, a passage port closure member rotatable from an open position in which flow through said mains inlet is unimpeded to a closed position in which flow through said mains inlet is prevented, valve actuation means for rotating said passage port closure member from an open to a closed position under the urging of urging means, trigger means which, when released, trigger operation of said valve actuation means, said trigger means including retainer means which ordinarily hold said shut-off valve in said open position against the force applied by said urging means, and sensor means arranged so as to be displaced by a rise in the level of water when it is suitably contained, whereby displacement of said sensor means provides a stimulus which is transmitted through a mechanical interaction to said trigger means so as to release said trigger means, and wherein said valve actuation means comprises a rotor connected to a spindle in operative association with said passage port closure member and said urging means comprises two off-set compression springs, each of which acts on a roller-type pin which in turn acts on said rotor.

41. A hot water system as claimed in claim 40 wherein said sensor means is a float.

\* \* \* \* \*